United States Patent [19]

Hussein et al.

[11] Patent Number: 5,625,012
[45] Date of Patent: Apr. 29, 1997

[54] PROCESS FOR REDUCING POLYMER BUILD-UP IN RECYCLE LINES AND HEAT EXCHANGERS DURING POLYMERIZATION OF ALPHA OLEFINS

[75] Inventors: Fathi D. Hussein, Cross Lanes; Kiu H. Lee, South Charleston, both of W. Va.; Xinlai Bai, Piscataway, N.J.

[73] Assignee: Union Carbide Chemicals & Plastics Technology Corporation, Danbury, Conn.

[21] Appl. No.: 540,985

[22] Filed: Oct. 11, 1995

Related U.S. Application Data

[63] Continuation of Ser. No. 269,048, Jun. 29, 1994, abandoned.
[51] Int. Cl.⁶ .................................................. C08F 2/34
[52] U.S. Cl. .............................. 526/74; 526/78; 526/901
[58] Field of Search .................................. 526/74, 78, 901

[56] References Cited

U.S. PATENT DOCUMENTS

| | | | |
|---|---|---|---|
| H860 | 12/1990 | Job | 525/247 |
| 4,059,720 | 11/1977 | Kolling et al. | 526/74 |
| 4,326,048 | 4/1982 | Stevens et al. | 526/68 |
| 4,536,484 | 8/1985 | Lacombe et al. | 526/125 |
| 4,994,534 | 2/1991 | Rhee et al. | 526/88 |
| 5,028,670 | 7/1991 | Chinh et al. | 526/74 |
| 5,034,480 | 7/1991 | Funk et al. | 526/74 |
| 5,037,905 | 8/1991 | Cummings et al. | 526/74 |
| 5,118,757 | 6/1992 | McCullough, Jr. | 525/322 |

FOREIGN PATENT DOCUMENTS

| | | |
|---|---|---|
| 0254234 | 7/1987 | European Pat. Off. |
| 0359444 | 8/1989 | European Pat. Off. |
| 0376559 | 12/1989 | European Pat. Off. |
| 0446059 | 7/1991 | European Pat. Off. |
| 3-106318 | 3/1991 | Japan. |
| 3-106319 | 3/1991 | Japan. |

Primary Examiner—Thomas R. Weber
Attorney, Agent, or Firm—B. L. Deppenbrock

[57] ABSTRACT

A method for inhibiting polymer build-up in a recycle line and a heat exchanger during a polymerization process of one or more alpha olefins, particularly sticky polymers, which method comprises introducing as an antifouling an alcohol having 1 to 10 carbon atoms, an alkyl or cycloalkyl ether having 2 to 20 carbon atoms, or a mixture thereof at one or more locations in the recycle gas line in an amount sufficient to inhibit polymer buildup.

11 Claims, No Drawings

PROCESS FOR REDUCING POLYMER BUILD-UP IN RECYCLE LINES AND HEAT EXCHANGERS DURING POLYMERIZATION OF ALPHA OLEFINS

This application is a Continuation of prior U.S. application Ser. No. 08/269,048 filed on Jun. 26, 1994, now abandoned.

FIELD OF THE INVENTION

This invention relates to the copolymerization of alpha olefins such as ethylene and propylene. More particularly, the present invention relates to a process for reducing polymer build-up or fouling in the recycle lines and heat exchangers during the polymerization of alpha olefins, particularly sticky polymers, in a gas phase fluidized bed reactor system.

BACKGROUND OF THE INVENTION

Although the invention in this disclosure is described with reference to copolymerization of propylene and ethylene, especially sticky polymers, it will be understood that the invention can be readily applied to the polymerization or copolymerization of other alpha-olefin monomer combinations such as ethylene-hexene, polyethylene, polypropylene, propylene-butene, propylene-hexene and also terpolymer systems.

Sticky polymers are defined as polymers which, although particulate at temperatures below the sticking or softening temperature, agglomerate at temperatures above the sticking or softening temperature. A polymer may be inherently sticky due to its chemical or mechanical properties or pass through a sticky phase during the production cycle. Sticky polymers are also referred to as non-free flowing polymers because of their tendency to compact into agglomerates of much larger sized than the original particles. To avoid agglomeration problems in the past, these polymers have been produced at temperatures below the softening temperature. However, U.S. Pat. No. 4,994,534 has taught a process for polymerizing sticky polymers at temperatures at or above the softening point of the sticky polymers in the presence of an inert particulate material (carbon black, silica, clays, talc, and other like materials). This patented process generally enhances the yield of product in relation to the catalyst and makes purging of the polymer product more efficient. In this polymerization process, sticky polymers are produced in a single reactor or by two or more reactors in series. Typically, the polymerization reaction in a gas phase reactor is catalyzed by a transition metal catalyst.

Unfortunately, during normal operations, the inner surfaces of the recycle gas lines and the inner surfaces of the tubes of the heat exchanger or cooler tend to foul with undesirable polymer deposits. Fouling in the recycle gas lines reduces gas flow and impedes the heat exchanger's capability of cooling recycled gas. As a consequence, the reactor must be shut down within a short time for cleaning. There is a need to reduce polymer build-up in the recycle lines and heat exchangers during the polymerization of sticky polymers in gas phase fluidized reactor system. U.S. Pat. No. 5,037,805 has disclosed a method for inhibiting polymer buildup in a heat exchanger during gas phase polymerization of alphaoolefins by introducing upstream of the heat exchanger para-ethyl-ethoxybenzoate (PEEB) in an amount sufficient to inhibit polymer buildup. However, there is an on-going need for additional methods for inhibiting polymer buildup in recycle lines and heat exchangers employed in gas phase fluidized bed polymerization processes.

SUMMARY OF THE INVENTION

It has been found that by adding an alcohol having 1 to 10 carbon atoms, an alkyl or cycloalkyl ether having 2 to 20 carbon atoms, or a mixture thereof as an antifouling agent at one or more locations in the recycle gas line reduces polymer build-up or fouling of the recycle lines and heat exchanger.

Accordingly, the present invention provides a method for inhibiting polymer build-up in a recycle line and a heat exchanger during the polymerization of alpha olefins which comprises introducing as an antifouling agent an alcohol having 1 to 10 carbon atoms, an alkyl or cycloalkyl ether having 2 to 20 carbon atoms, or a mixture thereof at one or more locations in the recycle gas line in an amount sufficient to inhibit polymer build-up.

DETAILED DESCRIPTION OF THE INVENTION

Sticky Polymers

The preferred alpha olefins produced by the present invention are ethylene propylene copolymers. Most preferably, the alpha olefins produced by the method of the present invention are ethylene propylene copolymers known as sticky polymers. Examples of sticky polymers can include ethylene/propylene rubbers, ethylene/propylene/diene rubbers, polybutadiene rubbers, high ethylene content propylene/ethylene block copolymers, poly (1-butene) when produced under certain reaction conditions, very low density (low modulus) polyethylenes, i.e., ethylene butene rubbers or hexene containing terpolymers, ethylene/propylene/ethyldienenorbornene, and ethylene/propylene hexadiene terpolymers of low density.

Ethylene-propylene copolymer and terpolymer rubbers are used in automotive applications such as weather stripping, hoses, tire sidewalls, and ignition cables. These rubbers are also used in wire and cable, construction, hose and tubing, and mechanical applications. Ethylene-propylene rubbers comprise polymer products that vary widely in composition, viscosity, and molecular weight distribution.

Polymerization Conditions

The ethylene propylene rubber polymerization is carried out in the gas phase, preferably in a fluidized bed made up of particulate ethylene propylene monomer (EPM) or ethylene propylene diene monomer (EPDM). The fluidized bed can be a stirred fluidized bed reactor or a fluidized bed reactor which is not stirred. In terms of the fluidized bed, a superficial gas velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 60 psi to about 250 psi. Ethylene propylene rubbers polymerizations are performed above the softening temperature of the polymer, i.e., about 20° C. to about 70° C. The gaseous feed streams of ethylene, propylene, and hydrogen (or other chain transfer agent) are preferably fed to the reactor recycle line while liquid ethylidene norbornene or another diene, if used, is preferably fed directly to the fluidized bed reactor to enhance mixing and dispersion. The composition of the EPM or EPDM product can be varied by changing the propylene/ethylene molar ratio in the gas phase and the diene concentration in the fluidized bed. The product is intermittently discharged from the reactor as the bed level builds up with polymerization. The production rate is controlled by adjusting the catalyst feed rate.

The propylene/ethylene molar ratio is adjusted to control the level of propylene incorporated into the copolymer or terpolymer. For the vanadium catalyst described above, a range of about 0.35:1 to about 3:1 is preferred. The hydrogen/ethylene molar ratio is adjusted to control average molecular weights. For the same catalyst system, a range of about 0.0005:1 to about 0.3:1 is preferred. The level of diene in the bed, if used, is in the range of about 1 to about 15 weight percent based on the weight of the bed, and is preferably in the range of about 2 to about 10 weight percent. Examples of useful dienes, in addition to ethylidene norbornene (ENB), are 1,4-hexadiene and dicyclopentadiene dimer.

Steps can be taken to reduce agglomeration in the gas phase polymerization. For example, in a preferred embodiment fluidization aids such as carbon black, silica, clay, alumina, calcium carbonate, and talc can be provided as described in U.S. Pat. No. 4,994,534. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static, i.e., about 0.5 to about 1.5 percent by weight based on the weight of the fluidized bed. The mean particle size of the inert conductive particulate material is in the range of about 0.01 to about 150 microns, preferably to about 10 microns. The mean particle size can refer to the particle per se or to an aggregate as in the case of carbon black. The carbon black employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures. In addition to carbon black, other antistatic agents are also found to be effective in keeping the static level under control as mentioned, for example, in U.S. Pat. No. 5,194,526.

The residence time of resin in the fluidized bed can be in the range of about 1.5 to about 8 hours and is preferably in the range of about 2 to about 4 hours. The molecular weight can be controlled with hydrogen or other chain transfer agents. The final ethylene propylene monomer (EPM) or ethylene propylene diene monomers (EPDM) product can contain the following amounts of reacted comonomers: about 35 to about 80 percent by weight ethylene; about 18 to about 50 percent by weight propylene; and about 0 to about 15 percent by weight diene. The crystallinity, also in weight percent based on the total weight of the EPM or EPDM, can be in the range of zero (essentially amorphous) to about 15 percent by weight (nearly amorphous). The Mooney viscosity can be in the range of about 10 to about 150 and is preferably about 30 to about 100. The Mooney viscosity is measured by introducing the EPM or EPDM into a vessel with a large rotor, preheating for one minute at 100° C., and then stirring for four minutes at the same temperature. The viscosity is measured at 100° C. in the usual manner.

Preferably, the polymerization is conducted in a gas-phase fluidized bed reactor. The fluidized bed reactor can be the one described in U.S. Pat. No. 4,482,687 or another conventional reactor for the gas phase production of, for example, polyethylene. The bed is usually made up of the same granular resin that is to be produced in the reactor. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid. The fluidizing gas is made up of the initial feed, make-up feed, and cycle (recycle) gas, i.e., monomers and, if desired, modifiers and/or an inert carrier gas. A typical cycle gas is comprised of ethylene, nitrogen, hydrogen, and propylene, either alone or in combination. The process can be carried out in a batch or continuous mode, the latter being preferred. The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

The process for the production of EPRs comprises contacting a mixture comprising ethylene, propylene, and, optionally, a diene, in the gas phase, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting essentially of (i) an alkylaluminum halide having the formula

$$AlR_{(3-a)}X_a$$

wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is about 1:1 to 5:1; and (d) optionally, a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

The catalyst precursor is vanadium (acetylacetonate)$_3$, a known compound having one vanadium cation and three enolate anions prepared by conventional processes. It can also be referred to as vanadium triacetylacetonate.

As noted above, a support is optional. If used, the support can be silica, alumina, or polymeric; however, silica is preferred. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.5 millimole of vanadium per gram of support and preferably about 0.3 to about 0.9 millimole of vanadium per gram of support. Impregnation of the above mentioned catalyst precursor into a silica support can be accomplished by mixing the precursor and silica gel in an inert solvent followed by solvent removal under reduced pressure.

Spray-drying technology can be used to generate well shaped catalyst precursors having little or no silica or other inorganic solids content.

The cocatalyst consists essentially of an alkylaluminum halide having the formula $$AlR_{(3-a)}X_{(a)}$$

wherein each R is independently alkyl having 1 to 14 carbon atoms; each X is independently chlorine, bromine, or iodine; and a is 1 or 2, and, optionally, a trialkylaluminum compound. Alkylaluminum halides falling within the above formula include alkylaluminum mono- and dichlorides wherein each alkyl radical has 1 to 6 carbon atoms. Examples of the alkylaluminum halides are diethylaluminum chloride; ethylaluminum dichloride; ethylaluminum sesquichloride; di-n-butylaluminum chloride; diisobutylaluminum chloride; methylaluminum sesquichloride; isobutylaluminum sesquichloride; dimethylaluminum chloride; di-nopropylaluminum chloride; methylaluminum dichloride; and isobutylaluminum dichloride.

Examples of the trialkylaluminum compounds, which can have the formula $AlR_3$ wherein R is the same as above are as follows: triisobutylaluminum, trihexylaluminum, di-isobutylhexylaluminum, isobutyl dihexyl-aluminum, trimethylaluminum, triethylaluminum, tripropylaluminum, triisopropylaluminum, tri-n-butylaluminum, trioctylaluminum, tridecylaluminum, and tridodecylaluminum. The molar ratio of alkylaluminum halide to trialkylaluminum compound, if present, is at least about 1.5:1, and is preferably in the range of about 2:1 to about 5:1.

The cocatalyst can be present in the catalyst system in an amount of about 10 to about 500 moles of cocatalyst per gram atom of vanadium, and is preferably introduced in an amount of about 50 to about 150 moles of cocatalyst per gram atom of vanadium. In a fluidized bed process, the cocatalyst can be introduced in an amount of about 1000 to about 10,000 parts per million parts (ppm) by weight of resin (polymer and fluidization aid, if any), and preferably in an amount of about 1500 to about 5000 parts per million parts of resin. About 0.01 to about 10 moles, and preferably about 0.1 to about 2 moles, of promoter can be used per mole of cocatalyst. In the fluidized bed process, the promoter can be introduced in an amount of about 500 to about 2500 parts per million parts (ppm) by weight of resin present in the fluidized bed plus, and preferably in an amount of about 800 to about 1800 parts per million parts of resin.

The optional promoter can be a chlorinated ester having at least 2 chlorine atoms or a perchlorinated ester. It can be impregnated into the support, if desired. Suitable esters are $Cl_3CCOOC_2H_5$ (ethyl trichloroacetate); $Cl_3CCOOCH_3$ (methyl trichloroacetate); $CCl_3CCl=CClCOOC_4H_9$; $C_6H_5CCl_2COOR$ wherein R is an alkyl radical having 1 to 8 carbon atoms; and $Cl_2C=CClCCl_2COOC_4H_9$. The promoter can also be a saturated aliphatic halocarbon having the formula $$C_3(X)_a(F)_b(H)_c$$

wherein each X is independently chlorine, bromine, or iodine; a is an integer from 6 to 8; b and c are integers from 0 to 2; and a+b+c equal 8. Examples of these halocarbon promoters are hexachloropropane, heptachloropropane, and octachloropropane. These saturated halocarbon promoters are mentioned in U.S. Pat. No. 4,892,853. In addition, the promoter can also be an unsaturated aliphatic halocarbon such as perchloropropene or any unsaturated halocarbon having a $CX_3$ group attached to a $C=C$ group wherein each X is independently chlorine, bromine, or iodine, or a haloalkyl substituted aromatic hydrocarbon wherein the haloalkyl substituent has at least 3 halogen atoms such as trichlorotoluene, and trichloroxylene. Again, the halogen can be chlorine, bromine, or iodine. The number of carbon atoms in the halocarbon or the haloalkyl substituent can be 1 to 14, and the number of benzene rings in the halocarbon or the aromatic hydrocarbon can be 1 to 3, but is preferably one.

As noted, the catalyst precursor can be impregnated into a support, if desired. In any case, the catalyst precursor, with or without the support, is dried. It can be introduced into the polymerization reactor in the supported form; as a liquid feed dissolved in a solvent; or in spray-dried form. The precursor is usually added prior to the introduction of the comonomers in a batch process, and continuously in a continuous process. The cocatalyst and promoter are preferably added separately neat or as solutions in an inert solvent, such as isopentane, to the polymerization reactor at the same time as the flow of monomers are initiated.

The catalyst precursor described above can be used in prepolymer form. A technique for prepolymerization can be found in U.S. Pat. No. 4,970,279. Typically, the prepolymerization is carried out in the liquid phase in a similar manner to a diluent slurry polymerization. The catalyst system used in the prepolymerization is the same one that will be used in the gas phase polymerization. The difference lies in the monomers used and weight ratio of monomer(s) to catalyst precursor, which is at least about 10:1, and is typically about 50:1 to about 300:1. It should be pointed out that the numbers vary with the particular catalyst system selected. The prepolymer does not have to be the same as the resin product of the main polymerization.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize prepolymer residue in the product resin. When using ethylene/propylene coprepolymers, prepolymer loading can be in the range of about 10 to about 500 grams of prepolymer per gram of catalyst precursor and is preferably in the range of about 50 to about 300 grams of prepolymer per gram of catalyst precursor.

A typical prepolymerization can be carried out in a slurry prepolymerizer. The equipment includes a monomer feed system, a reaction vessel, and an inert screener. The reactor is a jacketed pressure vessel with a helical ribbon agitator to give good solids mixing, and with a bottom cone to facilitate solids discharge. Ethylene is fed from cylinders, with the pressure regulated, through 4A or 13X molecular sieves to remove impurities, and then through a flow meter to measure flow rate. Other olefins, if required, are fed from cylinders via a dip tube with nitrogen pressure supplied to the cylinder headspace. They also pass through 4A or 13X molecular sieves and through a flow meter. The monomers can be fed to either the reactor headspace or subsurface, with subsurface preferred as it increases the reaction rate by eliminating one mass transfer step. Temperature is controlled with a closed loop tempered water system. Pressure is controlled with a vent/make-up system.

The finished prepolymerized catalyst is screened to remove skins, agglomerates, and other types of oversize particles that could cause feeding difficulties into the gas phase reactor. The screening is done with a vibratory screener with a 20 mesh screen. The screener is kept under a nitrogen atmosphere to maintain the prepolymerized catalyst activity. Oversize material is collected for disposition. The desired undersize fraction is discharged into a cylinder for storage and shipping.

The typical prepolymerization is a slurry polymerization of ethylene and one or more comonomers under mild conditions. Isopentane, hexane, and heptane can be used as the solvent, with isopentane preferred for its higher volatility. Mild conditions are necessary to minimize catalyst decay during the prepolymerization so that there is sufficient activity for the subsequent gas phase polymerization, which may occur months after the prepolymerization. Such conditions will vary with different catalyst systems, but are typically temperatures of about 25° to about 70° C., monomer partial pressures of about 15 to about 40 psi, and levels of cocatalyst and catalyst promoter of about 1 to about 5 moles per mole of vanadium. The prepolymer loading ranges from about 10 to about 500 grams of prepolymer per gram of supported catalyst precursor, preferably from about 50 to about 300 grams per gram. The comonomer content of the prepolymer can range from about 1 to about 40 weight percent. Hydrogen, or other chain transfer agents, can be added at the start of polymerization or throughout the polymerization to control molecular weight. When the polymerization is complete, the agitator is stopped and the solids are allowed to settle so that the excess solvent can be removed by decanting. The remaining solvent is removed by drying, using low temperatures to avoid catalyst decay. The dried prepolymer catalyst is discharged to a storage cylinder through an inert screener, to remove oversize (+20 mesh) material.

Antifouling Agent

Antifouling agents employed in the present invention are selected from the group consisting of a linear or branched alcohol having 1 to 10 carbon atoms, an alkyl or cycloalkyl having 2 to 20 carbon atoms, and a mixture thereof. Preferably, the antifouling agent is selected from the group consisting of an alcohol having 1 to 6 carbon atoms, an alkyl or cycloalkyl ether having 2 to 12 carbon atoms, and a mixture thereof. Most preferably, the antifouling agent is ethanol, isopropanol or tetrahydrofuran (THF). When an antifouling agent such as isopropanol is employed, it can be used preferably neat or is diluted with a hydrocarbon solvent such as isopentane for good dispersion. Other suitable hydrocarbon solvents can include, for example, hexane. When a solvent is employed, the amount of antifouling agent in solution (antifoulant plus solvent) ranges from about 1% to 100%, preferably about 1% to 20%, and most preferably about 4% to 10%. The amount of antifouling agent used can vary over a range of about 100 to about 2000 pounds of antifouling agent per million pounds of sticky resin produced (that is, 0.01% to about 0.2% based on the weight of resin being produced). Use of lower amounts will be less effective in preventing polymer buildup, while use of larger amounts will adversely affect the operation of the reactor, more specifically the catalyst activity. Preferred amounts of antifouling agent are within the range of about 200 to about 1000 pounds per million pounds, i.e., 0.02% to about 0.1% based on the weight of resin being produced. For example, when isopropanol is used to reduce fouling, it is fed into the recycle line at one or more locations where fouling is prone to occur. Preferably, the antifouling agent is fed into the recycle line in at least two separate locations. The agent can be fed intermittently or continually, and preferably, it is fed continuously. The antifouling agent should not be added to the reactor as this can adversely affect the polymerization process due to the formation of undesirable side reactions and/or inactivation of the catalyst system. It is believed that the antifouling agent selectively interacts with the cocatalyst in the recycle line gas or on entrained particles to reduce or eliminate polymer buildup in the recycle line and/or the heat exchanger.

As noted, the process of this invention can also be used to produce polyethylenes. These polyethylenes are homogeneous, characterized by narrow molecular weight distributions and narrow comonomer distributions. A typical process is described in U.S. Pat. No. 4,508,842. The catalyst precursor can be used in prepolymer form in polyethylene production just as in EPR production. The preferred temperature for the production of homogeneous polyethylenes is in the range of about 65° C. to about 85° C. The polyethylenes are, generally, copolymers of ethylene and one or more alpha-olefins having 3 to 12 carbon atoms, and preferably 3 to 8 carbon atoms. Examples of the alpha-olefins are propylene, 1-butene, 1-hexene, 4-methyl-1-pentene, and 1-octene. Typical comonomer molar ratios are as follows: the propylene/ethylene ratio can be in the range of about 0.05:1 to about 2.5:1 and is preferably in the range of about 0.25:1 to about 1.5:1. The 1-hexene/ethylene molar ratio can be in the range of about 0.005:1 to about 0.050:1 and is preferably in the range of about 0.008:1 to about 0.012:1. Homogeneous polyethylene can be generally effected with any vanadium precursor wherein vanadium is in the oxidation state of plus three or greater. The precursors can include, for example, $V(AcAc)_3$, $VOCl_3$, $VCl_3THF_3$, and $VO(OR)_3$ or a catalyst system as described in U.S. Pat. No. 4,508,842. However, vanadium precursors other than $V(AcAc)_3$ are not preferred embodiments. Vanadium compounds which can be used to provide these precursors can be found, for example, in U.S. Pat. No. 4,918,038.

The following examples will further illustrate the present invention.

EXAMPLES

This invention was tested in the pilot plant and illustrated by a number of examples. In each example, a sticky polymer was produced continuously in a gas-phase, fluidized bed reactor such as that taught in U.S. Pat. Nos. 4,482,687 and 4,994,534. The catalyst was a high oxidation state vanadium ($V^{+3}$ or higher) catalyst such as vanadium (acetylacetonate)$_3$ supported on silica particles as described in Ser. No. 083616, filed Jun. 28, 1993, now U.S. Pat. No. 5,342,907, or fed as a solution in a suitable solvent such as toluene or methylene chloride. The catalyst system also included an alkyl as cocatalyst, e.g. diethyl aluminum chloride (DEAC), and a promoter such as ethyl trichloroacetate (ETCA). Ethylene, hydrogen, and comonomers (propylene or the combination of propylene and diene) were continuously fed to the reactor. In each of the examples the diene used was ethylidene norbornene (ENB). A fluidization aid such as carbon black and/or calcined silica was used to make these sticky polymer products at a reaction temperature above their sticking temperature.

Control Example 1

The reactor was started under conditions that produced an ethylene-propylene-diene terpolymer using a supported vanadium (acetylacetonate)$_3$ catalyst and DEAC/ETCA catalyst system at 35° C. The reactor was operated at $C_3/C_2$ molar ratio of 1.2 and $H_2/C_2$ ratio of 0.20 to 0.29. Carbon black was fed to the reactor as a fluidization aid at a level of 10 to 15% in the resin by weight. As the reaction was stabilized to produce an EPDM hose and tube product, the recycle gas flow began to gradually drop indicating the initiation of fouling in parts of the recycle gas system such as the recycle line, compressor and heat exchanger. The fouling in the recycle gas system continued until the recycle gas flow had dropped below the minimum level needed to keep good fluidization. This resulted in reactor shutdown within 3 days.

Example 2: Use of Isopropanol (IPA).

The reactor was started at similar conditions as in Control Example 1 using the above catalyst system to produce EPDM products with Mooney viscosity in the range of 40 to 80 and diene content of 2 to 4 wt %. The reactor was operated at 40° C. reaction temperature and $C_3/C_2$ of 1.2 to 1.4 and $H_2/C_2$ of 0.05 to 0.1. Again, carbon black was used as a fluidization aid in the range of 10 to 15 wt %. IPA diluted in isopentane (10 wt % IPA in isopentane) was continuously fed upstream of the cycle gas compressor in the recycle line. The IPA solution was fed into the recycle line at a feed rate based on resin production. The IPA feed rate was about 350 to 400 ppm weight based on resin production rate.

The reactor operated smoothly with negligible to minor fouling in the recycle gas system for about 3 weeks.

Example 3: Use of Isopropanol

The reactor was started under similar conditions as in Example 2 above using the same catalyst system to produce EPDM products. The reactor was operated at $C_3/C_2$ of 1.2 and $H_2/C_2$ ratio of 0.025 to 0.065 to make EPDM products with 40 to 106 Mooney viscosity and 2 to 9.5 wt % diene content. Carbon black in the range of 10 to 25 wt % in the resin was used as fluidization aid. IPA diluted in isopentane (4 wt %) was fed continuously to the reactor at two locations in the recycle line: one location close to the entrance of the recycle line and another location upstream of the cycle gas compressor. The IPA solution feed rate was controlled to have about 700 to 900 ppm (weight) based on resin production.

The reactor operated smoothly with negligible to minor fouling in the recycle system for over 6 days when the reactor was transitioned to other conditions.

Comparative Example 4: Use of NPTMS

In this example NPTMS (n-propyltrimethoxysilane) a potential antifouling agent was tested. The reactor was started under similar conditions as in Example 2 above except for feeding NPTMS solution in place of IPA solution. NPTMS diluted in isopentane (2.5 wt %) was fed continuously to the recycle line upstream of the cycle gas compressor. The level of NPTMS feed rate was limited to 200 to 400 ppm (weight) based on the resin production rate because of the NPTMS detrimental effect on catalyst productivity. A gradual loss in recycle gas flow was observed within hours of introducing NPTMS to the cycle line indicating fouling in the recycle line system. The reactor was forced down within 1.5 days due to fouling in the recycle line.

Control Example 5: EPDM with Silica/Carbon-Control

The reactor was started up under similar conditions as in Control Example 1 to make EPDM hose and tube type product. Carbon black was initially used as fluidization aid until the reaction was stabilized. Later on, the carbon black feed rate was reduced and calcined silica feed was established. The carbon black feed rate was reduced to a level that left about 1 to 2 wt % in the resin to minimize electrostatic effects. Silica feed rate as adjusted to have about 4 wt % in the resin. The recycle gas flow began to gradually drop indicating fouling in the recycle line system. The reactor was finally forced down within 1.5 days due to heavy fouling.

Example 6: EPDM With Silica/Carbon Black and Isopropanol

The reactor was started up under Control Example 5 conditions. Carbon black feed was reduced to 1 to 2 wt % of the resin and silica feed was established to have about 3 to 7 wt % in the resin, Isopropanol diluted in isopentane was fed continuously to the recycle line at two locations: one location close to entrance of the recycle line and another location upstream of the cycle gas compressor. The IPA solution feed rate was controlled to have about 400 to 600 ppm weight based on resin production. The reactor operated smoothly with negligible fouling in the recycle line system for over 3 days with silica and carbon black as fluidization aids and an additional 4 days with carbon black alone as the fluidization aid.

What is claimed is:

1. A method for inhibiting polymer build-up in a recycle line and a heat exchanger during a polymerization of one or more alpha olefins in the presence of a transition metal catalyst which consists of introducing as an antifouling agent consisting of an alcohol having 1 to 10 carbon atoms, tetrahydrofuran, or a mixture thereof at one or more locations in the recycle gas line in an amount sufficient to inhibit polymer build-up.

2. The method according to claim 1 wherein said antifouling agent is employed in an amount of about 0.01% to about 0.2% based on the weight of resin being produced.

3. The method according to claim 2 wherein the antifouling agent is used neat or combined with at least one hydrocarbon solvent in an amount such that the amount of antifouling agent in solution ranges from about 1% to 100%.

4. The method according to claim 3 wherein the antifouling agent is isopropyl alcohol and the solvent is isopentane.

5. The method according to claim 1 wherein the alpha olefin is selected from the group consisting of:
   a) ethylene propylene rubbers;
   b) ethylene propylene diene rubbers;
   c) polybutadiene rubbers; and
   d) high ethylene content propylene ethylene block copolymers.

6. The method according to claim 5 wherein said ethylene propylene diene rubbers is either ethylene/propylene/ethylidene norbornene or ethylene/propylene/hexadiene.

7. The method according to claim 5 wherein the polymerization employs carbon black, silica, clay, calcium carbonate, alumina, or talc as a fluidization aid.

8. The method according to claim 5 wherein the antifouling agent is isopropyl alcohol dispersed in isopentane in an amount ranging from about 1% to about 20% based on a solution of ispentane and antifouling agent.

9. The method according to claim 5 wherein the catalyst is a vanadium catalyst in which the vanadium is in the oxidation state of plus 3 or greater.

10. The method according to claim 9 wherein the catalyst is a catalyst system comprising:
   (a) a catalyst precursor, in independent or prepolymer form, consisting of vanadium (acetylacetonate)$_3$;
   (b) optionally, a support for said precursor;
   (c) a cocatalyst consisting essentially of (i) an alkylaluminum halide having the formula $$AlR_{(3-a)}X_a$$

wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is about 1:1 to 5:1; and
   (d) optionally, a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

11. The method according to claim 1 wherein the antifouling agent is an alcohol having 1 to 10 carbon atoms.

* * * * *